Sept. 26, 1939.  A. H. SHANGLE  2,174,230
HOLDER FOR ELECTRICALLY HEATED TOOLS
Filed June 17, 1938  2 Sheets-Sheet 1
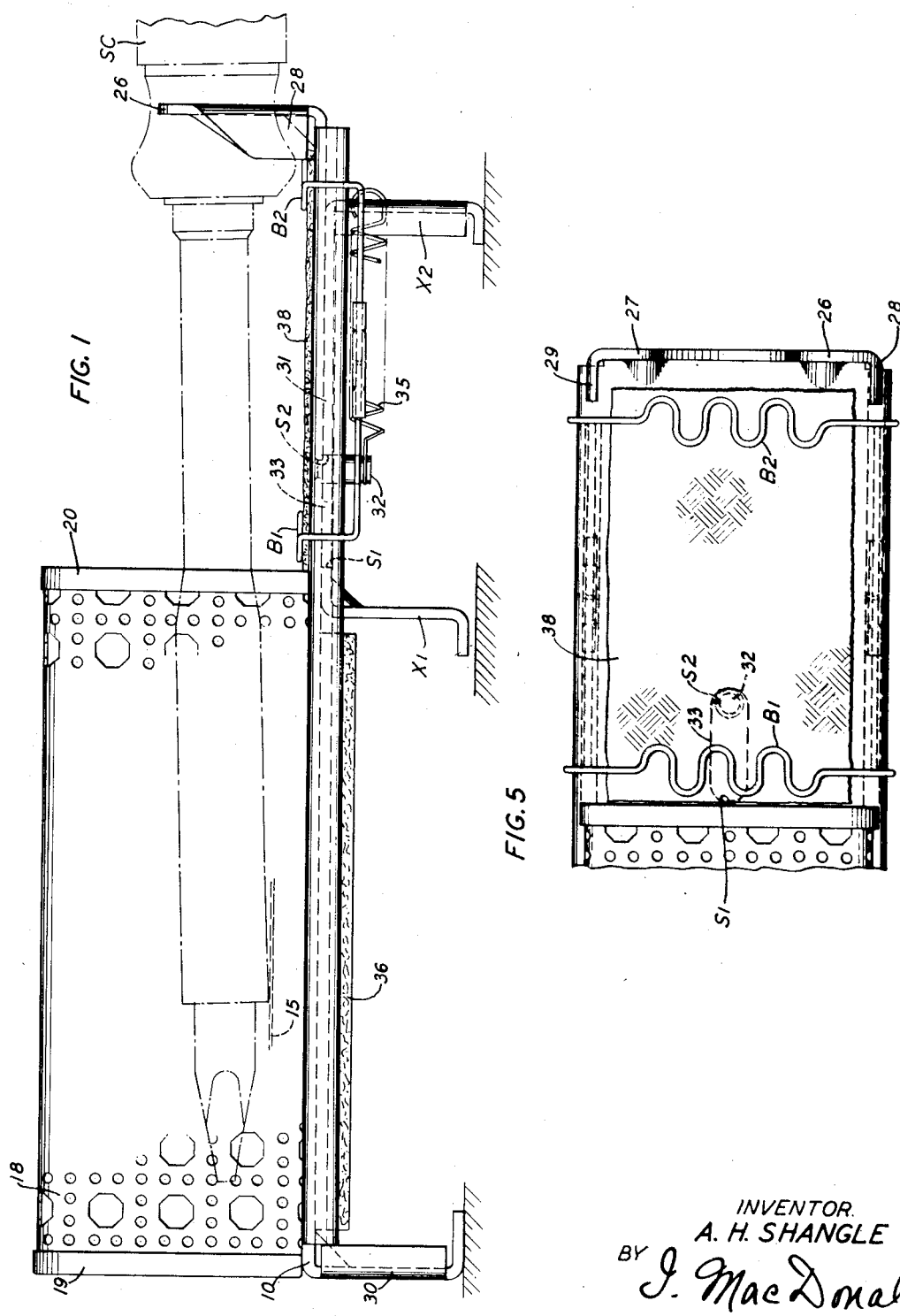
INVENTOR.
A. H. SHANGLE
BY J. MacDonald
ATTORNEY

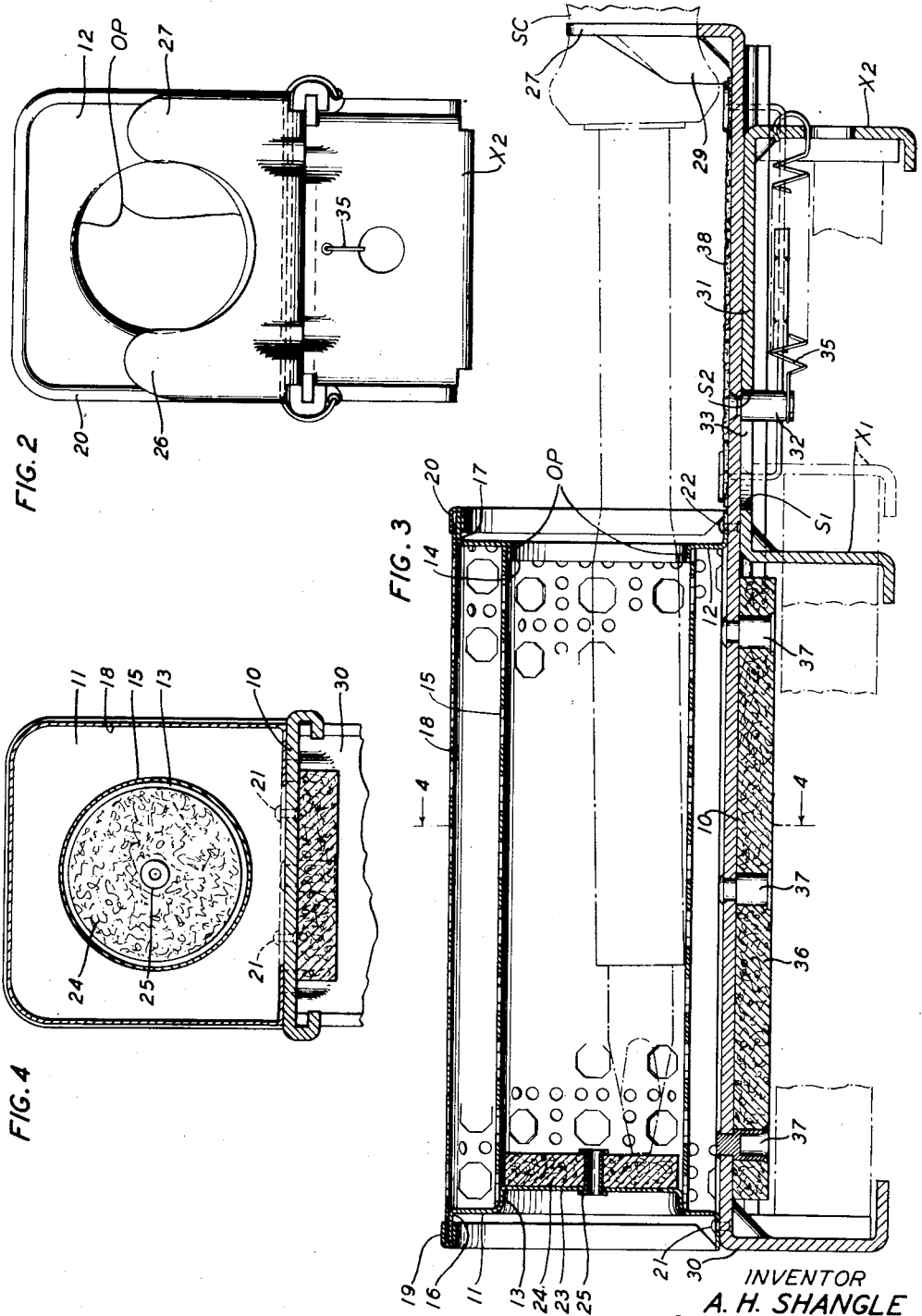

Patented Sept. 26, 1939

2,174,230

UNITED STATES PATENT OFFICE 2,174,230

HOLDER FOR ELECTRICALLY HEATED TOOLS

Amos H. Shangle, Roselle, N. J., assignor to Bell Telephone Laboratories, Incorporated, New York, N. Y., a corporation of New York Application June 17, 1938, Serial No. 214,364

2 Claims. (Cl. 113—111)

This invention relates to holder devices and more particularly to a type of holder which is especially well adapted for use in connection with soldering coppers and similar electrically heated tools.

The object of the invention is the provision of a soldering copper holder which will be simple, cheap to manufacture and convenient to use.

According to the invention a holder for a soldering copper is provided in which an oblong-shaped plate serves for mounting concentrically disposed shells serving as a casing or guard over the heat applying element of the soldering copper, while means is provided at the opposite end of the plate to serve as a rest for the handle of the soldering copper. The end of the plate adjacent the casing thus formed is bent in a direction opposite to that of the portion serving as a rest for the handle to form a stationary jaw member which, in cooperation with a movable jaw member, serves for clamping the holder to a ladder or other similar support and both cooperate to form standard or spacer members for the placing of the holder on a working bench or a shelf, a pad of heat resisting material being secured to the underside of the plate for insulating the soldering copper holder from the ladder or bench on which it may be hooked. The longitudinal edges of the plate are bent to form guiding means for the movable jaw which is held toward the stationary jaw member by a spring hooked to a stud carried by the plate and to the movable jaw, the stud cooperating with means formed in the movable jaw for permitting its movement in the guiding means formed with the plate, and clamping means is provided for securing the wiping pad on the plate at a point between the support for the handle of the soldering copper and the end of the casing.

Other novel features and advantages of the invention will appear from the following description and by the claims appended thereto, reference being had to the accompanying drawings in which:

Fig. 1 is a side elevation view;

Fig. 2 is a right-hand view;

Fig. 3 is a longitudinal sectional view;

Fig. 4 is a cross-sectional view taken on line 4—4 of Fig. 3; and

Fig. 5 is a partial view showing the wiping pad clamped in adjusted position on the plate.

In the drawings 10 is an oblong-shaped plate on one end of which is mounted a casing for housing the heat applying end of a soldering copper SC shown in dot and dash lines in Figs. 1 and 3.

This casing consists of flanges 11 and 12, each having a circular rim or bearing portion 13 and 14 provided for supporting the ends of a perforated metallic shell or tubing 15, these flanges having peripherally disposed ridges 16 and 17 shown in Fig. 3 which serve for mounting a second perforated metallic shell 18 of substantially square cross-section as shown in Figs. 2 and 4. The tubular shell 15, the shell 18 and the flanges 11 and 12 are held in assembled relation to each other by clamping bands 19 and 20 shown in Fig. 3, pressed and spot welded over the ends of shell 18 and the ridges 16 and 17 of flanges 11 and 12, the flanges 11 and 12 being afterward secured to the plate 10 by a number of rivets 21 and 22.

The circular rim of flange 12 forms an opening OP for permitting the insertion of the soldering copper in the inner disposed shell, while the disc portion 23 of flange 11 serves as a backing for a pad 24 of asbestos or other heat insulating material which is secured to the disc portion 23 of flange 11 by an eyelet 25.

The end of plate 10 opposite the soldering copper casing thus formed is bent substantially at right angles and is formed with prongs 26 and 27 between which the handle of the soldering copper is adapted to rest upon the placing of its associated heat applying element in the casing as shown in Figs. 1 and 3, the prongs 26 and 27 being formed with lug portions 28 and 29 which are bent inwardly and welded to plate 10 for reenforcing these prongs.

The end of plate 10 adjacent the casing is bent in the form of a hook in opposite direction to that of the prongs 26 and 27 to serve as a stationary jaw member 30 cooperating with a movable jaw member which will hereinafter be described in detail for permitting the clamping of the holder to a support element, as for example, a ladder or to serve as standard for the holder when resting on a bench.

The longitudinal edges of the plate 10 are bent along their entire length for reenforcing the plate and to form a groove provided for guiding a plate 31 formed at each end with a jaw member X1 and X2 while a stud 32 which is riveted to the plate 10 cooperates with stops S1 and S2 at the end of the slot 33 in the plate 31 for limiting its movement under the tension of a spring 35 having one of its ends hooked to the stud 32 and its other end to the jaw portion X2 as shown in Figs. 1, 2 and 3, this spring being provided for securing the holder to a support of a length equal to the distance from the stationary jaw member 30 to the jaw portion X1 or the jaw portion X2 of plate 31, as the case may be.

To the opposite side of plate 10 there is mounted a pad 36 of asbestos or other well-known heat resisting material securely held thereto by a plurality of rivets 37, these pads being provided to insulate the holder from the supports on which it may be attached or rest.

On the end of plate 10 opposite the casing, there is mounted a pad 38 of heat resisting material which is used for wiping the solder from the heat applying element of the soldering copper, this pad being securely held in place on the plate by a clamp made of a steel tempered wire bent according to the configuration of the cross-section of the plate 10 and engaging the parallel edges of the plate through the medium of the resiliency of back and forth bent portions as B1 and B2 shown in Figs. 1 and 5.

It is understood that minor changes may be made to the invention without departing from the scope of the appended claims.

What is claimed is:

1. In a soldering copper holder an oblong-shaped plate, a casing mounted in parallel relation to said plate for receiving the heat applying end of the soldering copper, said plate having one of its end portions bent at an angle to form a rest for the handle of the soldering copper and its longitudinal edges bent to form guiding means, a jaw member slidably mounted in said guiding means, a stationary jaw member formed with said plate at its other end and cooperating with said slidable jaw member for clamping said holder to a supporting element, and means carried by said plate cooperating with means carried by said movable jaw member for limiting the movement of said slidable jaw member relative to said stationary jaw member.

2. A soldering copper holder comprising an oblong-shaped plate having its end portions bent to form respectively a stationary jaw member and a rest for the handle of the soldering copper, a plurality of perforated metallic shells disposed in concentric relation to each other and secured to said plate to form a casing for receiving the heat applying end of the soldering copper, the longitudinal edges of said plate forming guiding elements, a rectangularly-shaped plate having its longitudinal edges engaging said guiding elements and its end portions bent to form jaw members cooperating with said stationary jaw member for clamping the soldering copper holder to supporting elements of different lengths, and a spring having its ends hooked to each of said plates for urging the movable jaw members toward said stationary jaw member.

AMOS H. SHANGLE.